(12) United States Patent
Kawase et al.

(10) Patent No.: US 8,844,276 B2
(45) Date of Patent: Sep. 30, 2014

(54) EXHAUST MUFFLER FOR GENERAL-PURPOSE ENGINE

(75) Inventors: Shoji Kawase, Wako (JP); Atsushi Maruyama, Wako (JP); Toru Kawai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 287 days.

(21) Appl. No.: 13/393,944

(22) PCT Filed: Sep. 14, 2009

(86) PCT No.: PCT/JP2009/066009
§ 371 (c)(1),
(2), (4) Date: May 7, 2012

(87) PCT Pub. No.: WO2011/030458
PCT Pub. Date: Mar. 17, 2011

(65) Prior Publication Data
US 2012/0210704 A1      Aug. 23, 2012

(51) Int. Cl.
*F01N 3/02* (2006.01)
*F01N 5/02* (2006.01)
*F01N 13/08* (2010.01)
*F01N 1/08* (2006.01)
*F01N 3/05* (2006.01)
*F01N 13/18* (2010.01)
*F01N 1/00* (2006.01)
*F01N 13/00* (2010.01)

(52) U.S. Cl.
CPC ............ *F01N 3/055* (2013.01); *F01N 13/1855* (2013.01); *F01N 2490/02* (2013.01); *F01N 1/003* (2013.01); *F01N 13/1805* (2013.01); *F01N 1/089* (2013.01); *F01N 13/002* (2013.01); *F01P 2060/16* (2013.01); *Y02T 10/20* (2013.01); *F01N 2230/00* (2013.01); *F01N 2240/02* (2013.01); *F01N 2590/06* (2013.01)
USPC .............. 60/320; 181/228; 181/264; 181/269

(58) Field of Classification Search
CPC ......... F01N 1/003; F01N 1/006; F01N 1/089; F01N 13/1805; F01N 13/1855; F01N 2470/05; F01N 2490/02; F01N 2490/155
USPC .................... 60/320; 181/228, 264, 268, 269
See application file for complete search history.

(56) References Cited

U.S. PATENT DOCUMENTS 3,993,160 A      11/1976   Rauch
4,330,239 A *    5/1982    Gannaway .................... 417/312
2009/0038879 A1  2/2009    Sato et al.

FOREIGN PATENT DOCUMENTS

CN     2551772 Y  *  5/2003  ............... F01N 1/08
JP     4-152240 A      5/1992

(Continued)

OTHER PUBLICATIONS

International Search Report of PCT/JP2009/066009, mailing date Dec. 22, 2009.

(Continued)

*Primary Examiner* — Audrey K Bradley (74) *Attorney, Agent, or Firm* — Westerman, Hattori, Daniels & Adrian, LLP (57) ABSTRACT

An exhaust muffler disposed in proximity to a cylinder of a general-purpose engine is provided, in which an exhaust muffler for a general-purpose engine is formed from a muffler main body connected to a cylinder of a general-purpose engine via an exhaust pipe and disposed adjacent to the cylinder, a partition member that divides the interior of the muffler main body into a first muffler chamber communicating with the exhaust pipe and a second muffler chamber communicating with an exhaust outlet of the muffler main body, and an exhaust cooling pipe exposed outside the muffler main body while providing communication between the first muffler chamber and the second muffler chamber. This enables exhaust gas to be cooled effectively by passing though the exhaust cooling pipe when moving from the first muffler chamber to the second muffler chamber, thus enhancing muffling by reducing the pressure of the exhaust gas.

3 Claims, 10 Drawing Sheets

(56) References Cited

FOREIGN PATENT DOCUMENTS

| | | | | |
|---|---|---|---|---|
| JP | 6-248930 A | 9/1994 | | |
| JP | 6-280553 A | 10/1994 | | |
| JP | 06280553 A | * 10/1994 | ................ | F01N 7/02 |
| JP | 7-063037 A | 3/1995 | | |
| JP | 11-200835 A | 7/1999 | | |
| JP | 2000-192808 A | 7/2000 | | |
| JP | 2005-201135 A | 7/2005 | | |
| JP | 2006-096075 A | 4/2006 | | |
| JP | 2007-002730 A | 1/2007 | | |

OTHER PUBLICATIONS

Chinese Office Action dated Jun. 5, 2013, issued in corresponding Chinese Patent Application No. 200980161404.6.

* cited by examiner

EXHAUST MUFFLER FOR GENERAL-PURPOSE ENGINE

TECHNICAL FIELD

The present invention relates to an improvement of an exhaust muffler for a general-purpose engine, the exhaust muffler including a muffler main body connected via an exhaust pipe to a cylinder of the general-purpose engine, a partition member that divides the interior of the muffler main body into a first muffler chamber communicating with the exhaust pipe and a second muffler chamber communicating with an exhaust outlet of the muffler main body, and communication means that provides communication between the first muffler chamber and the second muffler chamber.

BACKGROUND ART

Such an exhaust muffler for a general-purpose engine is already known, as disclosed in Patent Publication 1 below.
Patent Publication 1: Japanese Patent Application Laid-open No. 2007-2730

DISCLOSURE OF INVENTION

Problems to be Solved by the Invention

In general, in order to enhance the muffling effect for engine exhaust gas, reducing the pressure by cooling the exhaust gas is effective, and since it is possible in a motorcycle or an automobile to form an exhaust pipe for providing communication between an engine and an exhaust muffler so that it is sufficiently long, the engine exhaust gas can be cooled while the exhaust gas is passing through the exhaust pipe to thereby reduce the pressure.

However, in a general-purpose engine such as that disclosed in Patent Publication 1, since it is necessary to make the overall arrangement compact by disposing an exhaust muffler in proximity to a cylinder, an exhaust pipe providing communication between the cylinder and the exhaust muffler inevitably becomes short, and not very much cooling of exhaust gas by the exhaust pipe can be expected.

The present invention has been accomplished in light of such circumstances, and it is an object thereof to provide an exhaust muffler for a general-purpose engine in which, even though it is disposed in proximity to a cylinder of the general-purpose engine, the muffling effect can be enhanced by a reduction in the pressure of exhaust gas by enabling cooling of the exhaust gas to be promoted.

Means for Solving the Problems

In order to attain the above object, according to a first aspect of the present invention, there is provided an exhaust muffler for a general-purpose engine, comprising a muffler main body connected to a cylinder of a general-purpose engine via an exhaust pipe, a partition member that divides the interior of the muffler main body into a first muffler chamber communicating with the exhaust pipe and a second muffler chamber communicating with an exhaust outlet of the muffler main body, and communication means that provides communication between the first muffler chamber and the second muffler chamber, characterized in that the communication means is formed from an exhaust cooling pipe that is exposed outside the muffler main body while providing communication between the first muffler chamber and the second muffler chamber. The exhaust outlet corresponds to an exhaust outlet pipe 35 in an embodiment of the present invention, which is described later.

According to a second aspect of the present invention, in addition to the first aspect, the exhaust cooling pipe is disposed so that an upstream end thereof extends through one side wall, to which the exhaust pipe is connected, of the muffler main body and opens in the first muffler chamber and a downstream end thereof extends through the one side wall and the first muffler chamber and opens in the second muffler chamber.

According to a third aspect of the present invention, in addition to the first or second aspect, a stay secured together with the exhaust pipe to the cylinder is mounted on a portion of the exhaust cooling pipe that is exposed outside the muffler main body.

Effects of the Invention

In accordance with the first aspect of the present invention, exhaust gas that has flowed from the exhaust pipe into the first muffler chamber is cooled by passing through an exhaust cooling pipe exposed outside the muffler main body, and muffling of the exhaust gas can be achieved effectively by the reduction in pressure of the exhaust gas due to the above cooling. Furthermore, such reduction in pressure of the exhaust gas contributes not only to muffling but also to suppression of the afterburn phenomenon, in which unburned gas remaining within the exhaust muffler after the engine stops running spontaneously ignites. Moreover, since such reduction in pressure of the exhaust gas by cooling can be achieved by exposing the exhaust cooling pipe, which provides communication between the first muffler chamber and the second muffler chamber, beneath the muffler main body, it is unnecessary to especially increase the volume of the muffler main body, thus avoiding any increase in the size of the exhaust muffler.

In accordance with the second aspect of the present invention, the exhaust cooling pipe is mounted together with the exhaust pipe on one side wall of the muffler main body in a concentrated manner, and a good appearance can be maintained for the exhaust muffler.

In accordance with the third aspect of the present invention, the exhaust cooling pipe is supported on the cylinder of the engine via the stay, and vibration thereof can be suppressed effectively. Moreover, since securing of the stay to the cylinder utilizes securing of the exhaust pipe to the cylinder, securing means is simple and inexpensive.

EXPLANATION OF REFERENCE NUMERALS AND SYMBOLS

E Engine
M Exhaust muffler
3 Cylinder
10 Exhaust pipe
15 Muffler main body
16 First muffler chamber
17 Second muffler chamber
19 Partition member
31 Exhaust cooling pipe (communication means)
35 Exhaust outlet (exhaust outlet pipe)
43 Stay

BEST MODE FOR CARRYING OUT THE INVENTION

A mode for carrying out the present invention is explained by reference to a preferred embodiment of the present invention shown in the attached drawings.

Embodiment 1

First, in FIG. 1 to FIG. 4, an engine main body 1 of a general-purpose engine E is formed from a crankcase 2 having on its lower face a mounting flange 2a and horizontally supporting a crankshaft 4, and a cylinder 3 projecting obliquely upwardly from the crankcase 2 toward one side, a flywheel 12 (see FIG. 4) and a cooling fan 13 superimposed on the front end thereof being secured to the front end of the crankshaft 4. A rear end part of the crankshaft 4 serves as an output part that is connected to various types of work machines.

Mounted on the front side of the crankcase 2 are a recoil type engine starter 5 for cranking the crankshaft 4 and a grill 14 for taking in outside air, the grill 14 covering the starter 5. The grill 14 has a large number of outside air intake holes, and a shroud 42 connected to the rear end of the grill 14 and defining a cooling air passage 41 around the cylinder 3 is mounted on the crankcase 2 and the cylinder 3. In accordance with operation of the cooling fan 13, outside air, that is, cooling air, is taken in from the grill 14, made to flow through the cooling air passage 41 so as to cool the crankcase 2 and an area around the cylinder 3, and subsequently discharged toward an exhaust muffler M side, the exhaust muffler M being described later.

Furthermore, mounted on the engine main body 1 are a fuel tank T disposed above the crankcase 2, and an intake air cleaner A and the exhaust muffler M, which are adjacent to the fuel tank T immediately above the cylinder 3.

The cylinder 3 is formed from a cylinder block 3a connected to the crankcase 2, a cylinder head 3b joined to an end face of the cylinder block 3a and having a combustion chamber 7 that a piston 6 within the cylinder block 3a faces, and a head cover 3c joined to the cylinder head 3b and defining a valve operating chamber 8 therebetween, a lower end flange 10a of an exhaust pipe 10 communicating with an exhaust port 9 connected to the combustion chamber 7 is secured to the cylinder head 3b via a bolt 11, and the exhaust muffler M is connected to the exhaust pipe 10. The exhaust pipe 10 is formed relatively short so that the exhaust muffler M can be disposed adjacent to the cylinder 3.

The exhaust muffler M is explained by reference to FIG. 5 to FIG. 10.

Figure 1:
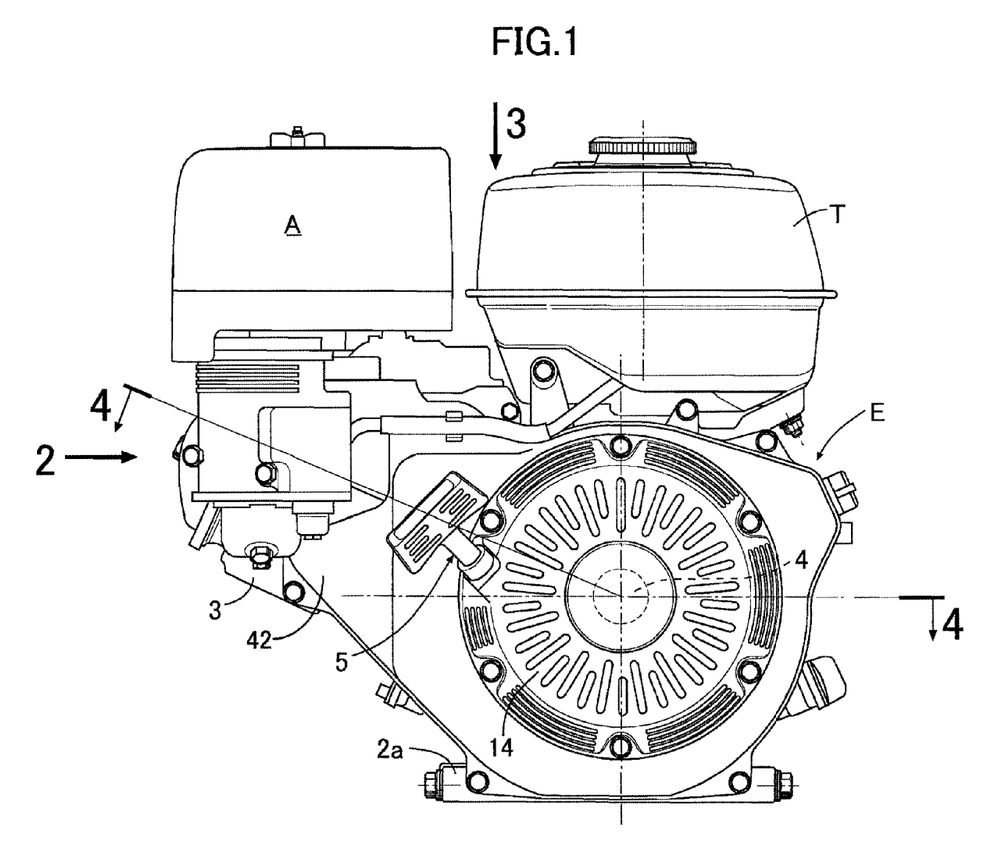
FIG. 1 is a front view of a general-purpose engine related to an embodiment of the present invention. (first embodiment)
Figure 2:
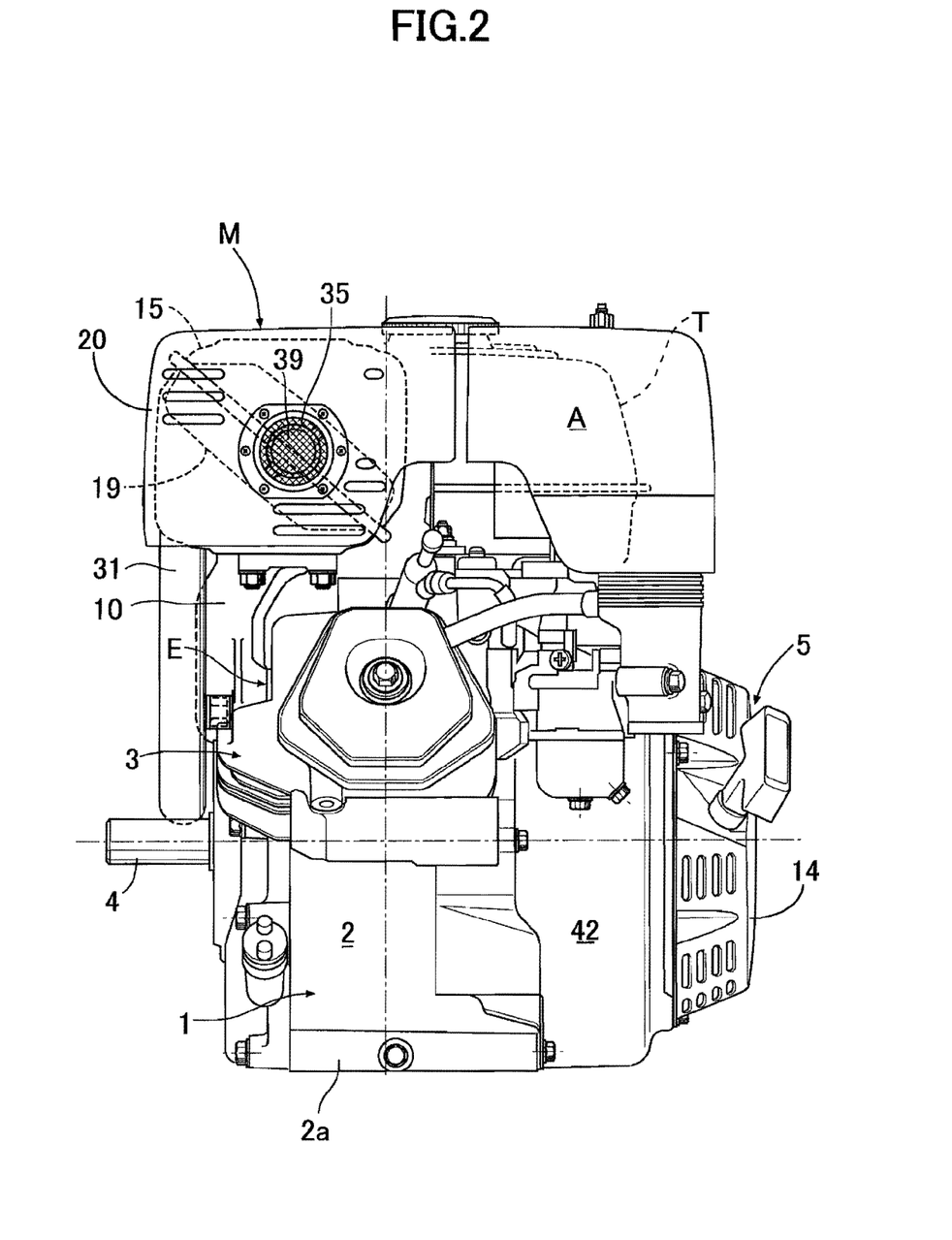
FIG. 2 is a view from arrow 2 in FIG. 1. (first embodiment)
Figure 3:
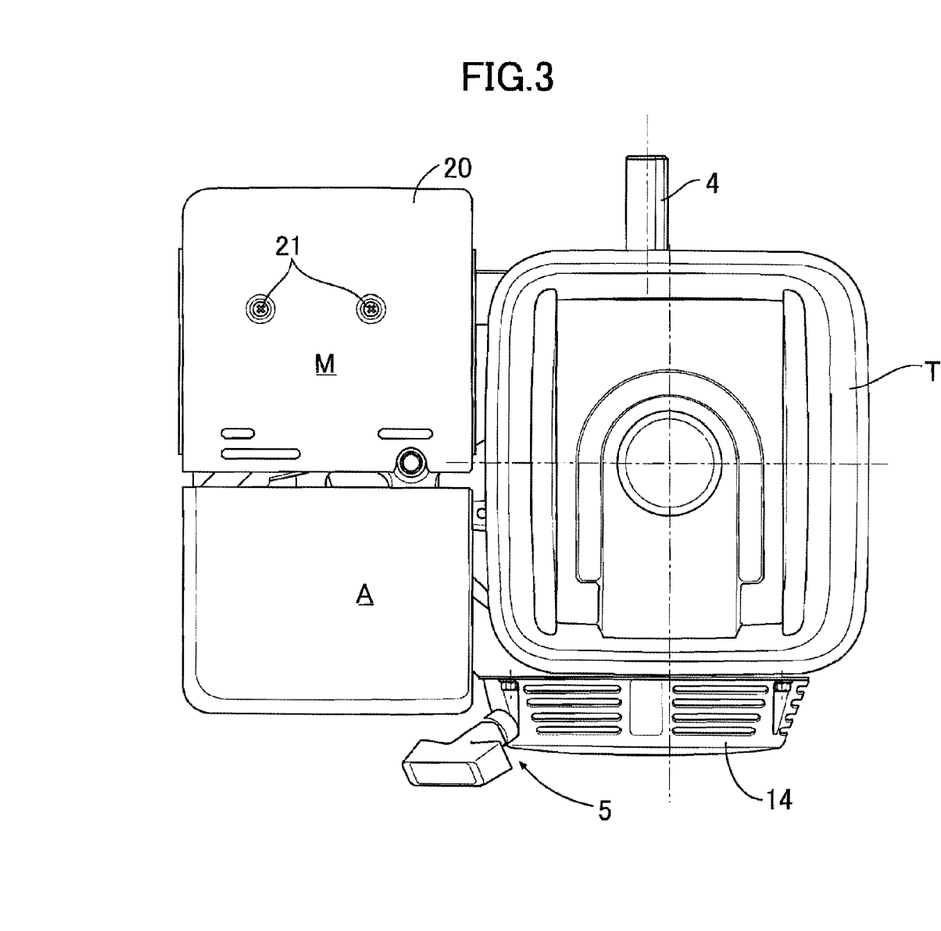
FIG. 3 is a view from arrow 3 in FIG. 1. (first embodiment)
Figure 4:
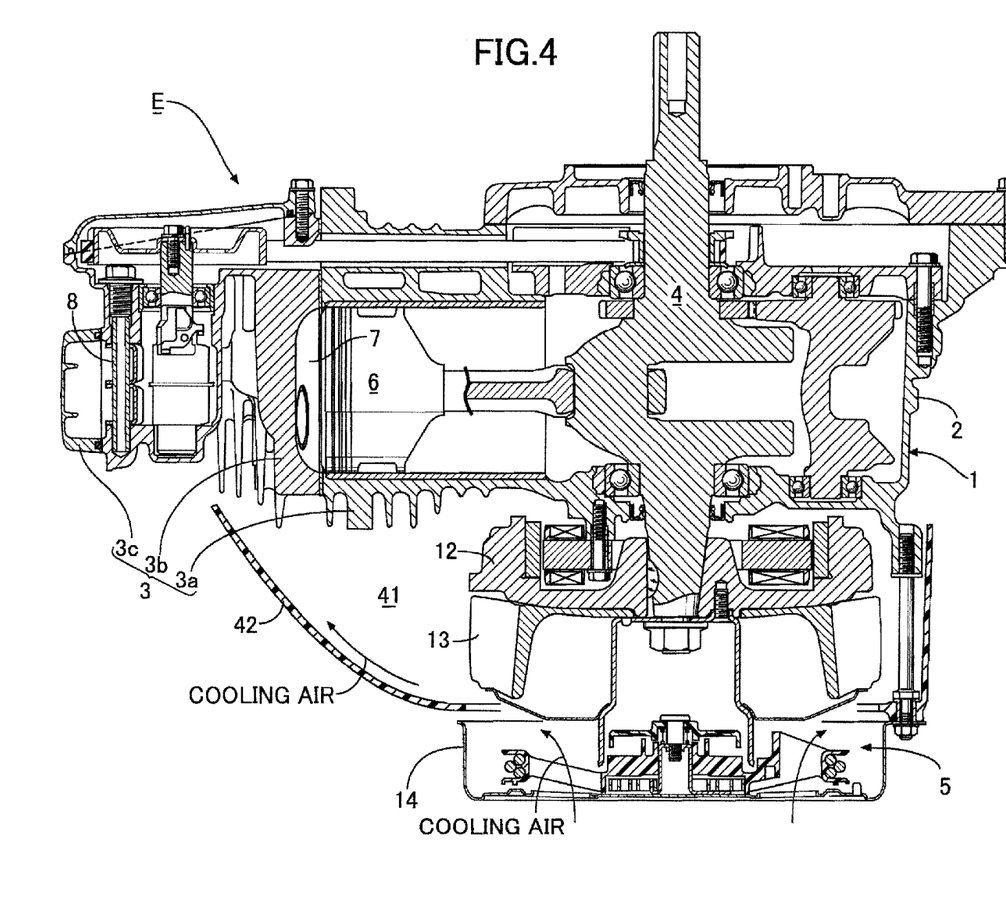
FIG. 4 is a sectional view of the general-purpose engine along line 4-4 in FIG. 1. (first embodiment)
Figure 5:
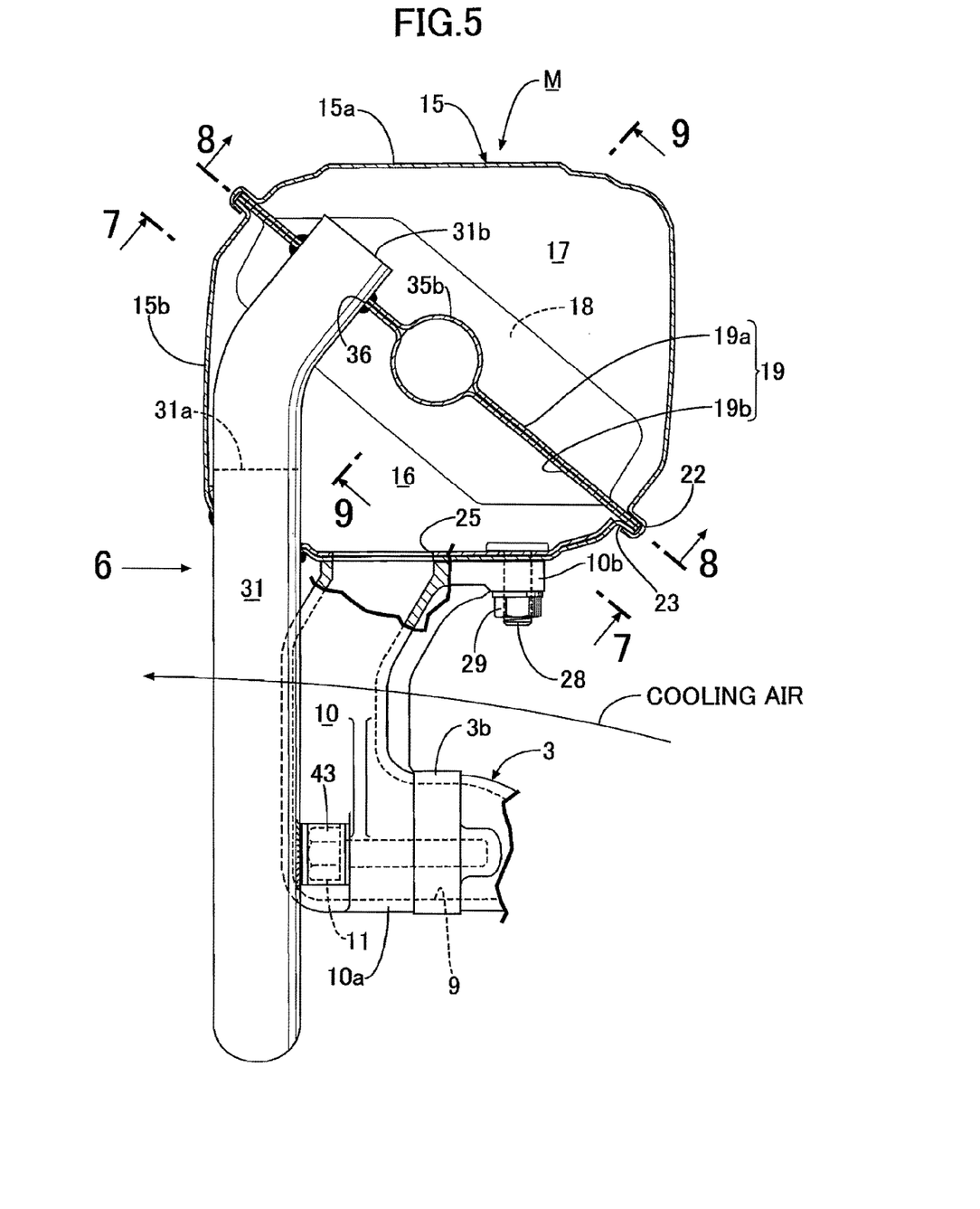
FIG. 5 is an enlarged sectional view of an exhaust muffler part in FIG. 2. (first embodiment)
Figure 6:
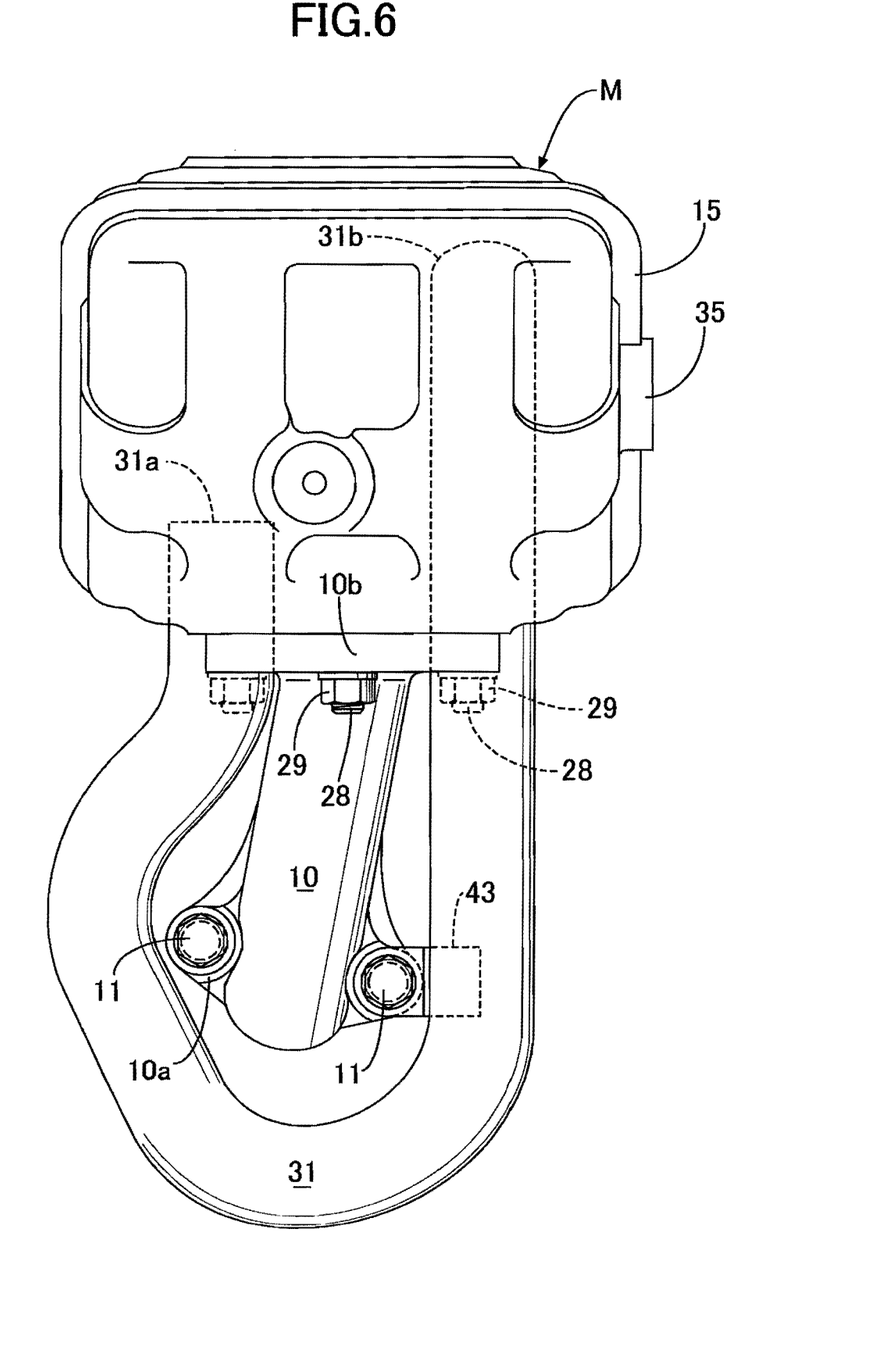
FIG. 6 is a view from arrow 6 in FIG. 5. (first embodiment)
Figure 7:
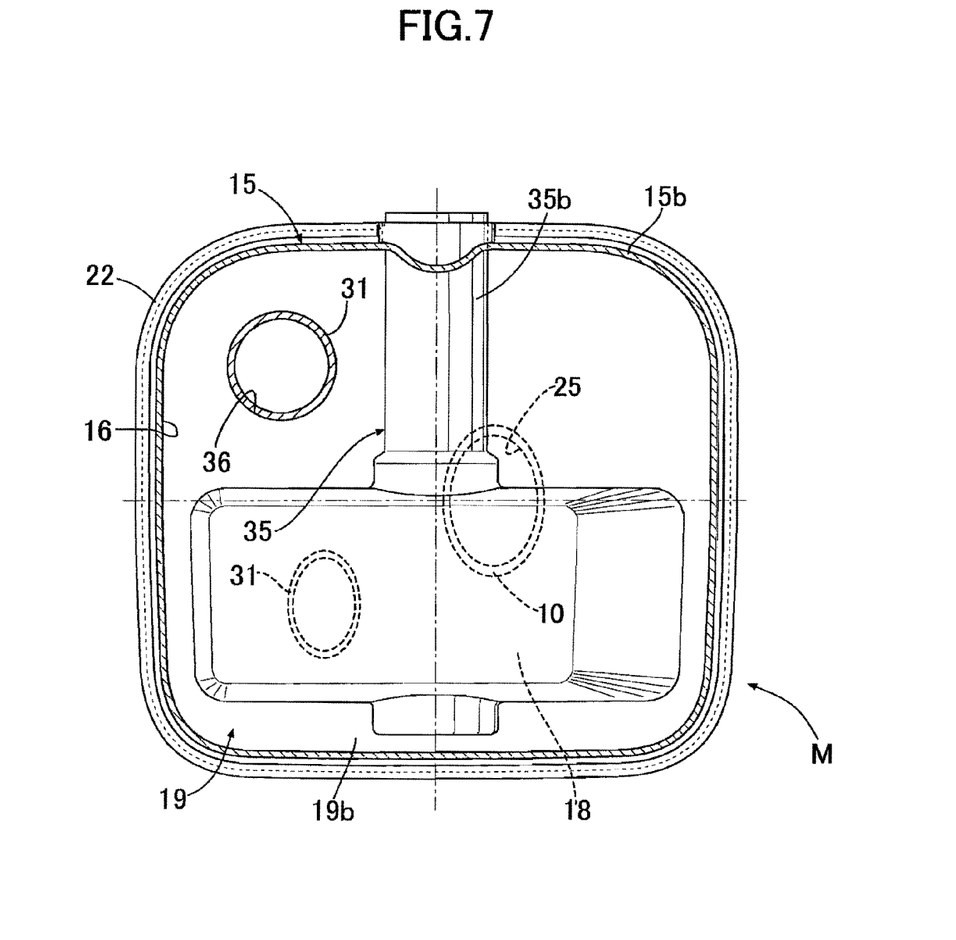
FIG. 7 is a sectional view along line 7-7 in FIG. 5. (first embodiment)
Figure 8:
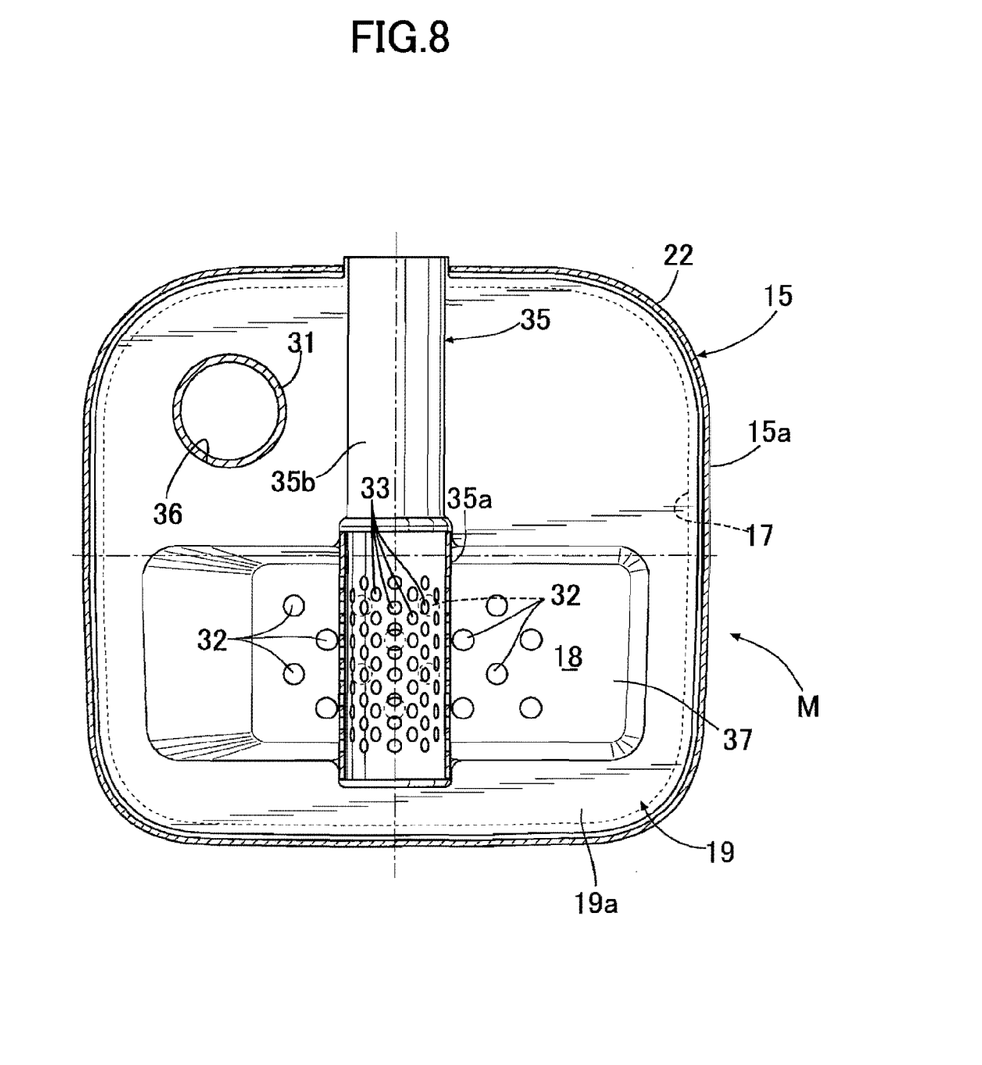
FIG. 8 is a sectional view along line 8-8 in FIG. 5. (first embodiment)

As shown in FIG. 5 and FIG. 6, the exhaust muffler M is formed from a box-shaped muffler main body 15, a partition member 19 that is disposed along one diagonal line within the muffler main body 15 and divides the interior thereof into a first muffler chamber 16 and a second muffler chamber 17, and a muffler cover 20 made of synthetic resin or steel sheet that covers an outside face of the muffler main body 15 apart from a lower face on the exhaust pipe 10 side and is secured to the muffler main body 15 via a plurality of tapping screws 21.

The muffler main body 15 is formed from an upper muffler half 15a and lower muffler half 15b made of steel sheet, which are divided along one diagonal line, and the two muffler halves 15a and 15b are joined by crimping a crimping portion 22 on the outer periphery of the upper muffler half 15a onto a flange portion 23 on the outer periphery of the lower muffler half 15b. In this arrangement, interposing an outer peripheral part of the partition member 19 between the crimping portion 22 and the flange portion 23 enables the partition member 19 to be joined to the muffler main body 15.

A connecting bolt 28 is welded to an inner face of an underside wall of the lower muffler half 15b, the connecting bolt 28 projecting beneath the underside wall, and the lower muffler half 15b is secured to an upper end flange 10b of the exhaust pipe 10 by means of the connecting bolt 28 and a nut 29 screwed thereonto. An exhaust inlet 25 is provided in the underside wall of the lower muffler half 15b, the exhaust inlet 25 making the exhaust pipe 10 open in the first muffler chamber 16.

Furthermore, an exhaust cooling pipe 31 bent into a U shape is welded to the underside wall of the lower muffler half 15b. An upstream end 31a of the exhaust cooling pipe 31 extends through the underside wall of the lower muffler half 15b and opens in the middle in the vertical direction of the first muffler chamber 16, and a downstream end 31b thereof extends through the underside wall of the lower muffler half 15b, the first muffler chamber 16, and the partition member 19 and opens in the second muffler chamber 17. Here, the exhaust cooling pipe 31 is welded to an area around a through hole 36 of the partition member 19, through which the exhaust cooling pipe 31 extends. The area around the exhaust pipe 10 and the exhaust cooling pipe 31, which are exposed outside the muffler main body 15, is a passage for cooling air that has finished cooling the cylinder 3 as described above.

As shown in FIG. 5 and FIG. 6, a stay 43 is secured by welding to a portion of the exhaust cooling pipe 31 that is exposed beneath the muffler main body 15, and this stay 43 is secured together with the lower end flange 10a of the exhaust pipe 10 to the cylinder head 3b by the bolt 11.

As shown in FIG. 7 to FIG. 10, the partition member 19 is formed from an upper partition half 19a and lower partition half 19b made from steel sheet, which are joined together. Formed between half portions of these two partition halves 19a and 19b by expanding the half portions outward is a third muffler chamber 18, and a group of first communication holes 32 providing communication between the second muffler chamber 17 and the third muffler chamber 18 are provided in the upper partition half 19a. The third muffler chamber 18 opens to the atmosphere via an exhaust outlet pipe 35.

The exhaust outlet pipe 35 is formed from a pipe member 35a supported between the upper and lower partition halves 19a and 19b so as to cross the third muffler chamber 18, and a pipe-shaped portion 35b formed in an expanded manner between the upper and lower partition halves 19a and 19b so as to communicate with the pipe member 35a, the pipe-shaped portion 35b being disposed so as to extend between joining faces of the upper and lower muffler halves 15a and 15b and project outside. A group of second communication holes 33 providing communication between the third muffler chamber 18 and the exhaust outlet pipe 35 are provided in the pipe member 35a.

Figure 9:
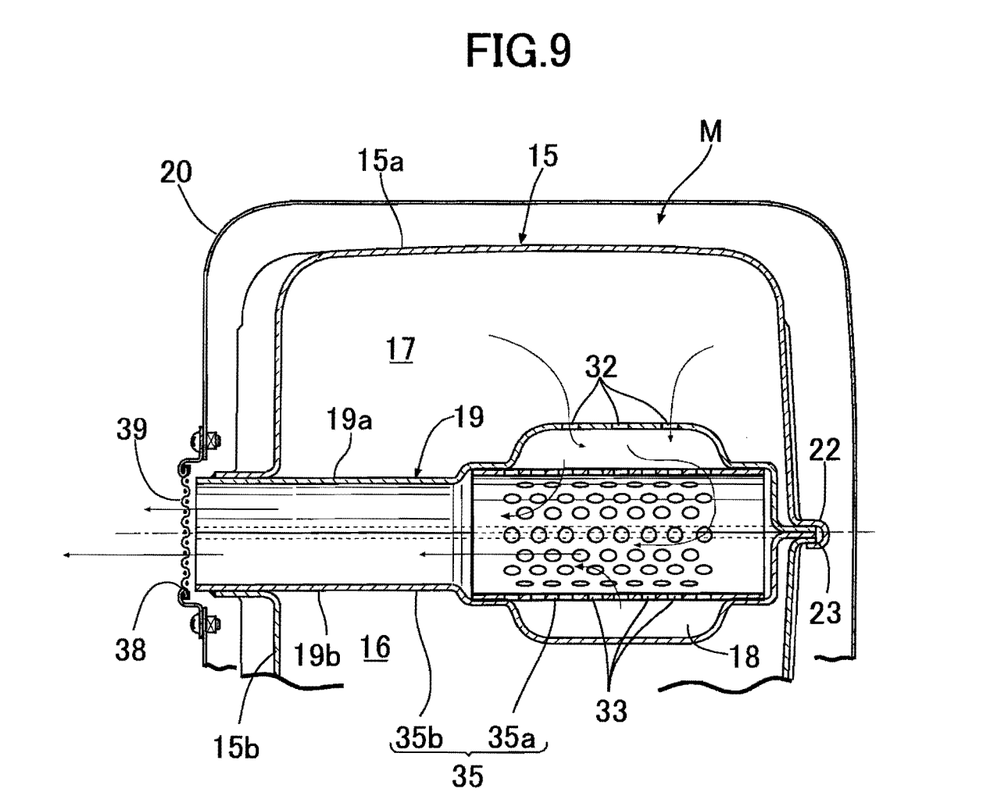
FIG. 9 is a sectional view along line 9-9 in FIG. 5. (first embodiment)
Figure 10:
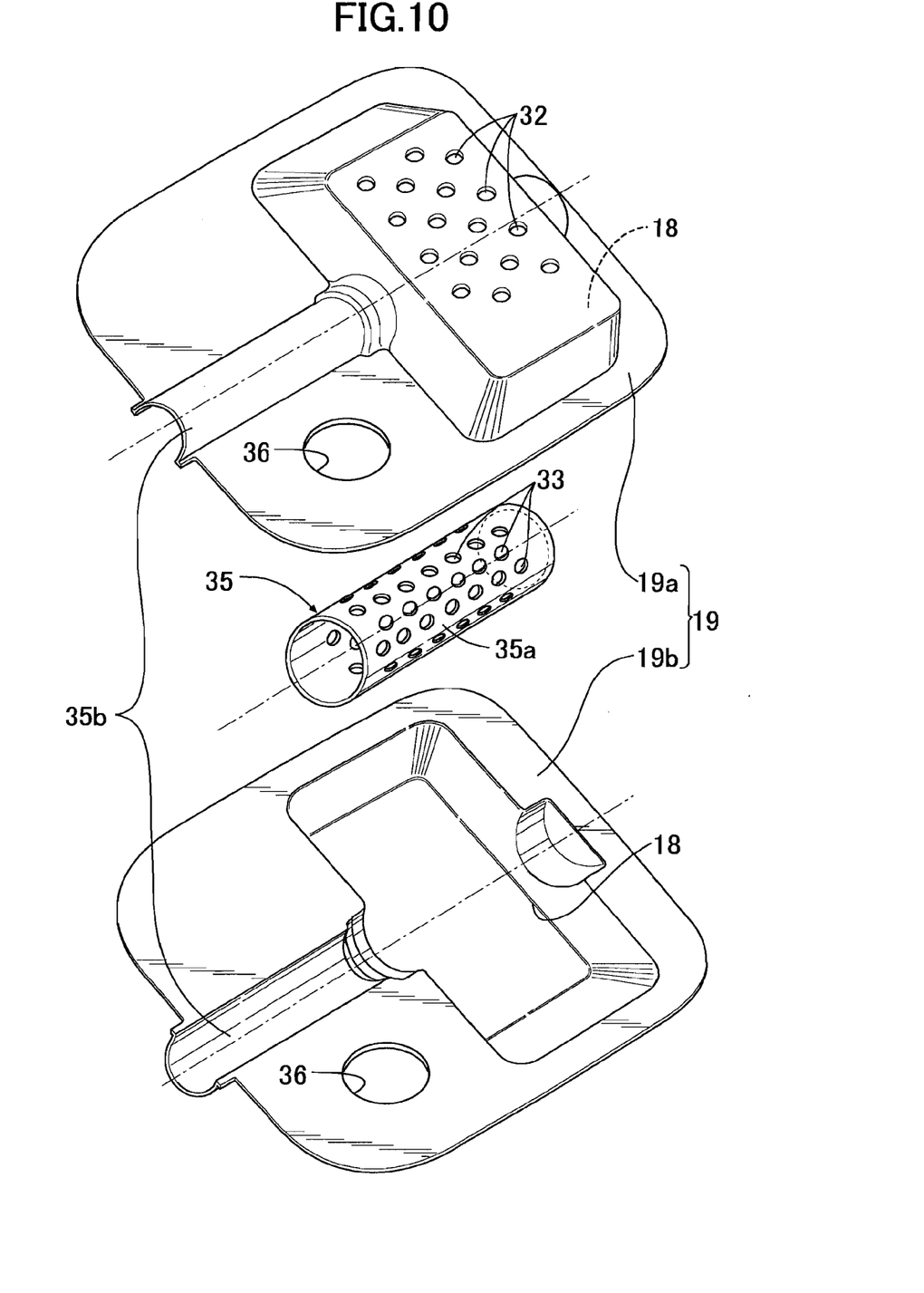
FIG. 10 is an exploded perspective view of a partition member within the exhaust muffler. (first embodiment)

As shown in FIG. 9, the muffler cover 20 is provided with a through hole 38 that receives an outer end opening of the exhaust outlet pipe 35, and has attached thereto a spark arrestor 39 made of a metal net and covering the though hole 38.

The operation of this embodiment is now explained.

Exhaust gas emitted from the combustion chamber 7 during an exhaust stroke of the engine E flows into the first muffler chamber 16 via the exhaust port 9, the exhaust pipe 10, and the exhaust inlet 25 in sequence, subsequently moves from the first muffler chamber 16 to the second muffler chamber 17 via the exhaust cooling pipe 31, subsequently moves to the third muffler chamber 18 via the first communication holes 32, further moves to the interior of the exhaust outlet pipe 35 via the second communication holes 33, and is discharged to the atmosphere. In this way, the exhaust gas is muffled by the attenuation action of multiple expansions while moving in sequence from the exhaust pipe 10 to the exhaust outlet pipe 35.

The point to be noted here is that exhaust gas that has flowed from the exhaust pipe 10 into the first muffler chamber 16 is cooled by passing through the U-shaped exhaust cooling pipe 31 mounted on the underside wall of the muffler main body 15 and exposed to the outside air beneath the muffler main body 15, and since the pressure of the exhaust gas is decreased by the cooling, muffling of the exhaust gas can be achieved effectively. Moreover, since the exhaust pipe 10 and the exhaust cooling pipe 31 are disposed in the passage for cooling air that has cooled the cylinder 3, the exhaust pipe 10 and the exhaust cooling pipe 31 can be cooled effectively by the cooling air, and reduction by cooling of the pressure of exhaust gas flowing through the interiors thereof can be promoted.

Such reduction in pressure of the exhaust gas gives rise to an effect not only in muffling but also in suppressing the phenomenon of afterburn, that is, unburned gas remaining within the exhaust muffler M after the general-purpose engine E stops running spontaneously igniting.

Furthermore, since such reduction in pressure of the exhaust gas by cooling can be achieved by exposing the exhaust cooling pipe 31, which provides communication between the first muffler chamber 16 and the second muffler chamber 17, beneath the muffler main body 15, it is unnecessary to especially increase the volume of the muffler main body 15, thus avoiding any increase in the size of the exhaust muffler M.

Moreover, the exhaust cooling pipe 31, which provides communication between the first muffler chamber 16 and the second muffler chamber 17, is disposed so that once having come from the first muffler chamber 16 it extends through the underside wall of the muffler main body 15 and exits downward, extends again through the underside wall, further extends through the first muffler chamber 16, and opens in the second muffler chamber 17, the exhaust cooling pipe 31 is thus mounted together with the exhaust pipe 10 on the underside wall of the muffler main body 15 in a concentrated manner, and it is thereby possible to suppress sideways or upward projection of the exhaust cooling pipe 31 from the muffler main body 15, thus maintaining a good appearance for the exhaust muffler M.

The present invention is not limited to the above-mentioned embodiment and may be modified in a variety of ways as long as the modifications do not depart from the spirit and scope thereof. For example, the second muffler chamber 17 may communicate directly with the exhaust outlet pipe 35, thus eliminating the third muffler chamber 18.

The invention claimed is:

1. An exhaust muffler for a general-purpose engine, comprising a muffler main body connected to a cylinder of a general-purpose engine via an exhaust pipe, a partition member that divides the interior of the muffler main body into a first muffler chamber communicating with the exhaust pipe and a second muffler chamber communicating with an exhaust outlet of the muffler main body, and communication means that provides communication between the first muffler chamber and the second muffler chamber, wherein the communication means is formed from an exhaust cooling pipe that is exposed outside the muffler main body while providing communication between the first muffler chamber and the second muffler chamber, and further wherein the exhaust cooling pipe is disposed so that and upstream end thereof extends through one side wall, to which the exhaust pipe is connected, of the muffler main body and opens in the first muffler chamber and a downstream end thereof extends through said one side wall and the first muffler chamber and opens in the second muffler chamber.

2. An exhaust muffler for a general-purpose engine, comprising a muffler main body connected to a cylinder of a general-purpose en engine via an exhaust pipe, a partition member that divides the interior of the muffler main body into a first muffler chamber communicating with the exhaust pipe and a second muffler chamber communicating with an exhaust outlet of the muffler main body, and communication means that provides communication between the first muffler chamber and the second muffler chamber, wherein the communication means is formed from an exhaust cooling pipe that is exposed outside the muffler main body while providing communication between the first muffler chamber and the second muffler chamber, and further wherein a stay secured together with the exhaust pipe to the cylinder is mounted on a portion of the exhaust cooling pipe that is exposed outside the muffler main body.

3. An exhaust muffler for a general-purpose engine, comprising a muffler main body connected to a cylinder of a general-purpose engine via an exhaust pipe, a partition member that divides the interior of the muffler main body into a first muffler chamber communicating with the exhaust pipe and a second muffler chamber communicating with an exhaust outlet of the muffler main body, and communication means that provides communication between the first muffler chamber and the second muffler chamber, wherein the communication means is formed from an exhaust cooling pipe that is exposed outside the muffler main body while providing communication between the first muffler chamber and the second muffler chamber, wherein the exhaust cooling pipe is disposed so that an upstream end thereof extends through one side wall, to which the exhaust pipe is connected, of the muffler main body and opens in the first muffler chamber and a downstream end thereof extends through said one side wall and the first muffler chamber and opens in the second muffler chamber, and further wherein a stay secured together with the exhaust pipe to the cylinder is mounted on a portion of the exhaust cooling pipe that is exposed outside the muffler main body.

* * * * *